United States Patent
Kondoh (10) Patent No.: US 6,339,416 B1
(45) Date of Patent: Jan. 15, 2002

(54) ANTIFERROELECTRIC LIQUID CRYSTAL DISPLAY AND METHOD OF DRIVING

(75) Inventor: Shinya Kondoh, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/423,465

(22) PCT Filed: Feb. 26, 1999

(86) PCT No.: PCT/JP99/00959

§ 371 Date: Nov. 9, 1999

§ 102(e) Date: Nov. 9, 1999

(87) PCT Pub. No.: WO99/46634

PCT Pub. Date: Sep. 16, 1999

(30) Foreign Application Priority Data

Mar. 10, 1998 (JP) .......................................... 10-057689

(51) Int. Cl.[7] .................................................. G09G 3/36
(52) U.S. Cl. ........................... 345/97; 345/94; 349/174
(58) Field of Search ............................. 345/87, 94, 97; 349/174

(56) References Cited

U.S. PATENT DOCUMENTS

| 5,349,367 A | * | 9/1994 | Wakita ........................ 345/97 |
| 5,459,481 A | * | 10/1995 | Tankana et al. .............. 345/95 |
| 5,886,775 A | * | 3/1999 | Imotot et al. ................ 349/174 |
| 5,945,971 A | * | 8/1999 | Imoto et al. .................. 345/97 |
| 6,008,787 A | * | 12/1999 | Kondoh ........................ 345/97 |
| 6,232,942 B1 | * | 5/2001 | Imoto et al. .................. 345/97 |

FOREIGN PATENT DOCUMENTS

| EP | 0 886 257 | * 12/1998 | ............. G09G/3/36 |
| EP | 0 919 849 | * 12/1998 | ............. G02F/1/133 |
| EP | 0 990 940 | * 8/1999 | ............. G02F/1/133 |
| EP | 0 992 835 | * 9/1999 | ............. G02F/1/33 |
| EP | 1 028 347 | * 9/2000 | ............. G02F/1/133 |
| JP | 4-311922 | 11/1992 | |
| JP | 5-94160 | 4/1993 | |

* cited by examiner

*Primary Examiner*—Amare Mengistu
(74) *Attorney, Agent, or Firm*—Finnegan, Henderson, Farabow, Garrett & Dunner, L.L.P.

(57) ABSTRACT

In a liquid crystal display comprising a liquid crystal panel with an antiferroelectric liquid crystal sandwiched between a pair of substrates having scanning electrodes and signal electrodes, a display driving voltage waveform in which the peak value of a scanning voltage waveform applied during a selection period is set equal to the peak value of a scanning voltage waveform applied during a non-selection period is output as a layer structure controlling voltage waveform for a predetermined length of time. The liquid crystal panel includes a temperature sensor, and in accordance with the information output from the temperature sensor, the display driving voltage waveform with both peak values set equal is output as the layer structure controlling voltage waveform for the optional length of time.

10 Claims, 11 Drawing Sheets

ANTIFERROELECTRIC LIQUID CRYSTAL DISPLAY AND METHOD OF DRIVING

TECHNICAL FIELD

The present invention relates to an antiferroelectric liquid crystal display, such as a liquid crystal display panel or a liquid crystal optical shutter array, having a liquid crystal layer of antiferroelectric liquid crystal, and a method of driving the same.

BACKGROUND ART

Liquid crystal panels using antiferroelectric liquid crystals have been researched extensively since it was reported in Japanese Patent Unexamined Publication No. 2-173724 by Nippondenso and Showa Shell Sekiyu that such liquid crystal panels provide wide viewing angles, are capable of fast response, and have good multiplexing characteristics.

The conventional art driving method, however, has had the problem that after the same image pattern has been displayed for a long period of time, when a different image pattern is displayed on the screen, the previously displayed image remains slightly visible on the screen (this phenomenon is hereinafter called the "image sticking phenomenon").

It is believed that this phenomenon occurs because an antiferroelectric liquid crystal cell is formed in a smetic layer structure and the amount of light transmitted through the liquid crystal panel varies depending on the geometry of the layer structure. To prevent this image sticking phenomenon, it has been proposed to apply a layer structure controlling voltage waveform each time the layer structure changes. For example, Japanese Patent Unexamined Publication No. 6-202078 discloses a configuration in which, in addition to the usual display driving circuit, a layer structure controlling voltage waveform circuit is provided which applies a layer structure controlling voltage waveform to the liquid crystal panel.

However, since the layer structure controlling voltage waveform differs in frequency and peak value from the display driving voltage waveform, the layer structure controlling voltage waveform circuit, including a clock generating circuit, voltage value conversion circuit, etc., needs to be provided separately from the display driving circuit. As a result, two circuits, i.e., the display driving circuit and the layer structure controlling voltage waveform circuit, must be provided for one liquid crystal display, which not only increases the size and complexity of the liquid crystal display circuitry but also leads to higher manufacturing costs.

It is, accordingly, an object of the present invention to provide an antiferroelectric liquid crystal display that is compact in construction and inexpensive to manufacture by using a display driving circuit adapted to output a layer structure controlling voltage waveform and thereby eliminating the need to provide a layer structure controlling voltage waveform circuit separately. It is also an object of the present invention to provide a method of driving such an antiferroelectric liquid crystal display.

DISCLOSURE OF THE INVENTION

After studying the display driving voltage waveform and layer structure controlling voltage waveform for antiferroelectric liquid crystal, it has been discovered that if the display driving voltage waveform is set so that the peak value of the scanning voltage applied during the non-selection period becomes equal to the peak value of the voltage applied during the selection period, a voltage waveform close to the optimum layer structure controlling voltage waveform can be obtained.

In view of this, to achieve the above object, in the present invention, the display driving voltage waveform is set so that the peak value of the scanning voltage waveform applied during the selection period becomes equal to the peak value of the scanning voltage waveform applied during the non-selection period, and the thus set display driving voltage waveform is output as a layer structure controlling voltage waveform, not as a display driving voltage waveform, from the display driving circuit for a optional length of time for application to the liquid crystal.

Further, the liquid crystal panel includes a temperature sensor and, in accordance with the information output from the temperature sensor, the display driving voltage waveform in which the peak value of the scanning voltage waveform applied during the selection period is set equal to the peak value of the scanning voltage waveform applied during the non-selection period is output as the layer structure controlling voltage waveform for the optional length of time.

Alternatively, the display driving voltage waveform with both peak values set equal is output as the layer structure controlling voltage waveform for optional length of time at predetermined intervals of time.

Preferably, the display driving voltage waveform has a reset period preceding the selection period.

ADVANTAGEOUS EFFECT OF THE INVENTION

According to the present invention, in the display driving voltage waveform, the peak value of the voltage waveform applied during the selection period is set equal to the peak value of the voltage waveform applied during the non-selection period. By using this waveform as the layer structure controlling voltage waveform, it becomes possible to reduce the "image sticking phenomenon" without providing a separate layer structure controlling voltage waveform circuit and to produce a good display without degrading the display quality. Furthermore, an antiferroelectric liquid crystal display, which is compact and inexpensive compared with the conventional art, can be realized.

Furthermore, since the temperature sensor is provided so that the layer structure controlling voltage waveform is applied at appropriate timing, the "image sticking phenomenon" can be reduced in a reliable manner.

DETAILED DESCRIPTION OF THE INVENTION

Embodiments of the present invention will be described in detail below with reference to the accompanying drawings.

Figure 1:
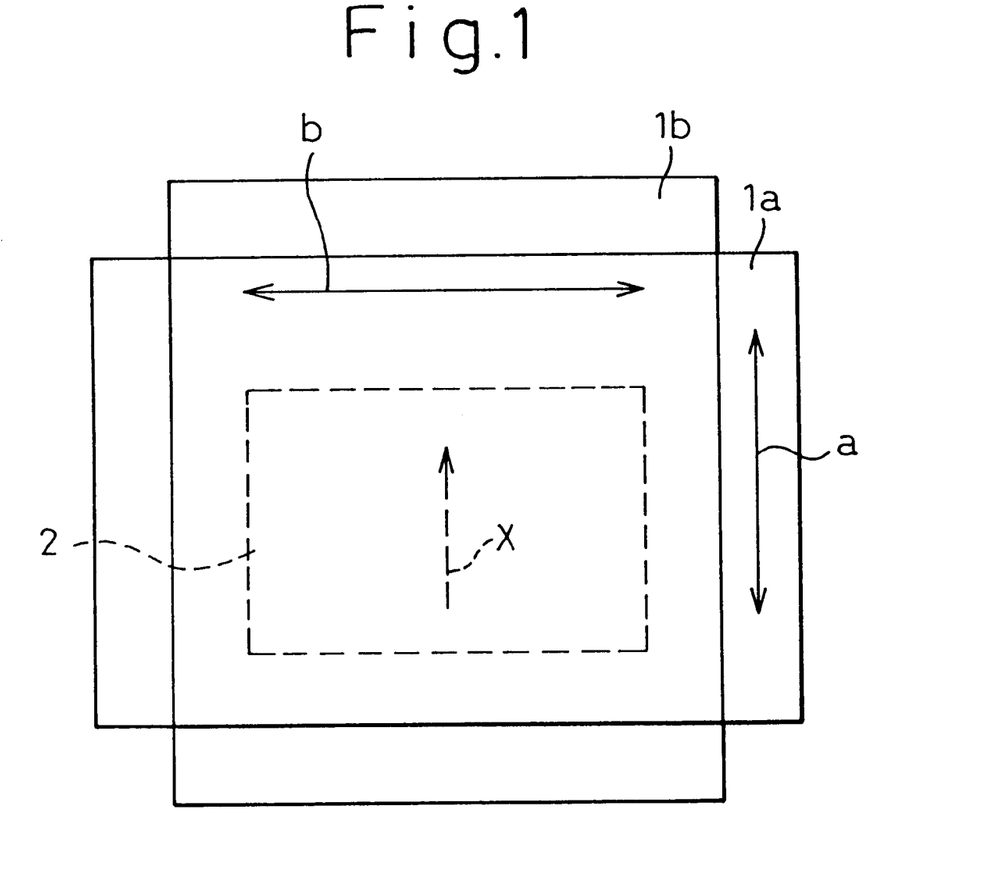
FIG. 1 is a diagram showing the arrangement of a liquid crystal device when antiferroelectric liquid crystal is used as a display.

FIG. 1 is a diagram showing the arrangement of a liquid crystal device, when an antiferroelectric liquid crystal is used, as a display. Between polarizers 1a and 1b arranged in a crossed Nicol configuration is placed a liquid crystal cell 2 in such a manner that the average long axis direction x of molecules in the absence of an applied voltage is oriented substantially parallel to either the polarization axis, a, of the polarizer 1a or the polarization axis, b, of the polarizer 1b. Then, the liquid crystal cell is set up so that a black display is produced when no voltage is applied and a white display produced when a voltage is applied.

Figure 2:
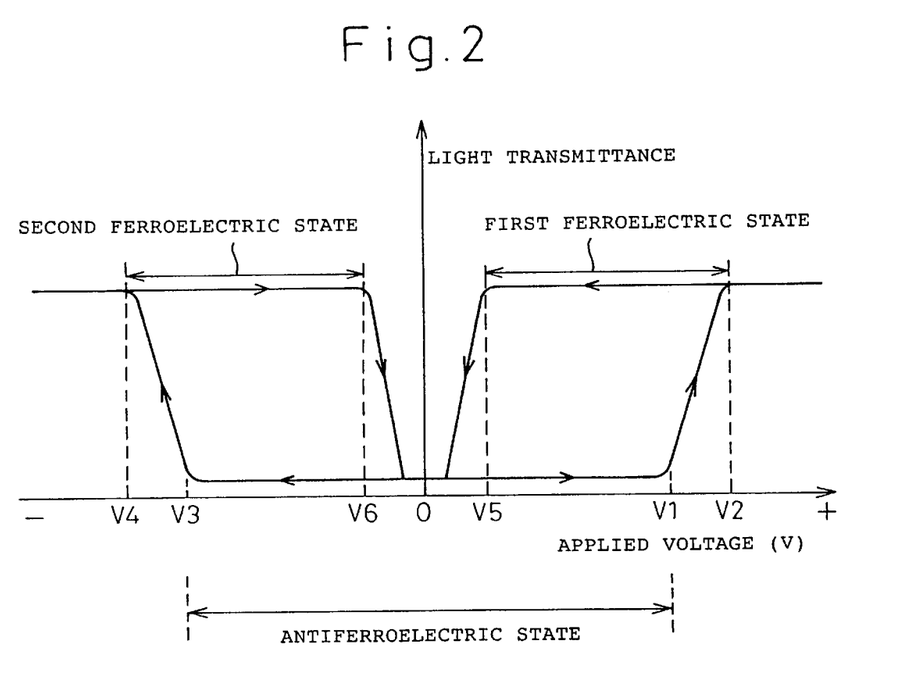
FIG. 2 is a diagram showing how the light transmittance of the antiferroelectric liquid crystal display device varies with an applied voltage.

When the voltage is applied across the thus arranged liquid crystal device, its light transmittance varies with the applied voltage, describing a loop as plotted in the graph of FIG. 2. The voltage value at which the light transmittance begins to change when the applied voltage is increased is denoted by V1, and the voltage value at which the light transmittance reaches saturation is denoted by V2, while the voltage value at which the light transmittance begins to drop when the applied voltage is decreased is denoted by V5. Further, when a voltage of opposite polarity is applied, the voltage value at which the light transmittance begins to change when the absolute value of the applied voltage is increased is denoted by V3, and the voltage value at which the light transmittance reaches saturation is denoted by V4, while the voltage value at which the light transmittance begins to change when the absolute value of the applied voltage is decreased is denoted by V6. As shown in FIG. 2, a first ferroelectric state is selected when the value of the applied voltage is greater than the threshold of the antiferroelectric liquid crystal molecules. When the voltage of opposite polarity greater than the threshold of the antiferroelectric liquid crystal molecules is applied, a second ferroelectric state is selected. In either of these ferroelectric states, when the voltage value drops below a certain threshold, an antiferroelectric state is selected. The antiferroelectric liquid crystal display can be constructed to produce a black display in the antiferroelectric state or a white display in the antiferroelectric state. The present invention is applicable to both modes of operation. However, the description hereinafter given assumes that the display is set up to produce a black display in the antiferroelectric state.

Figure 3:
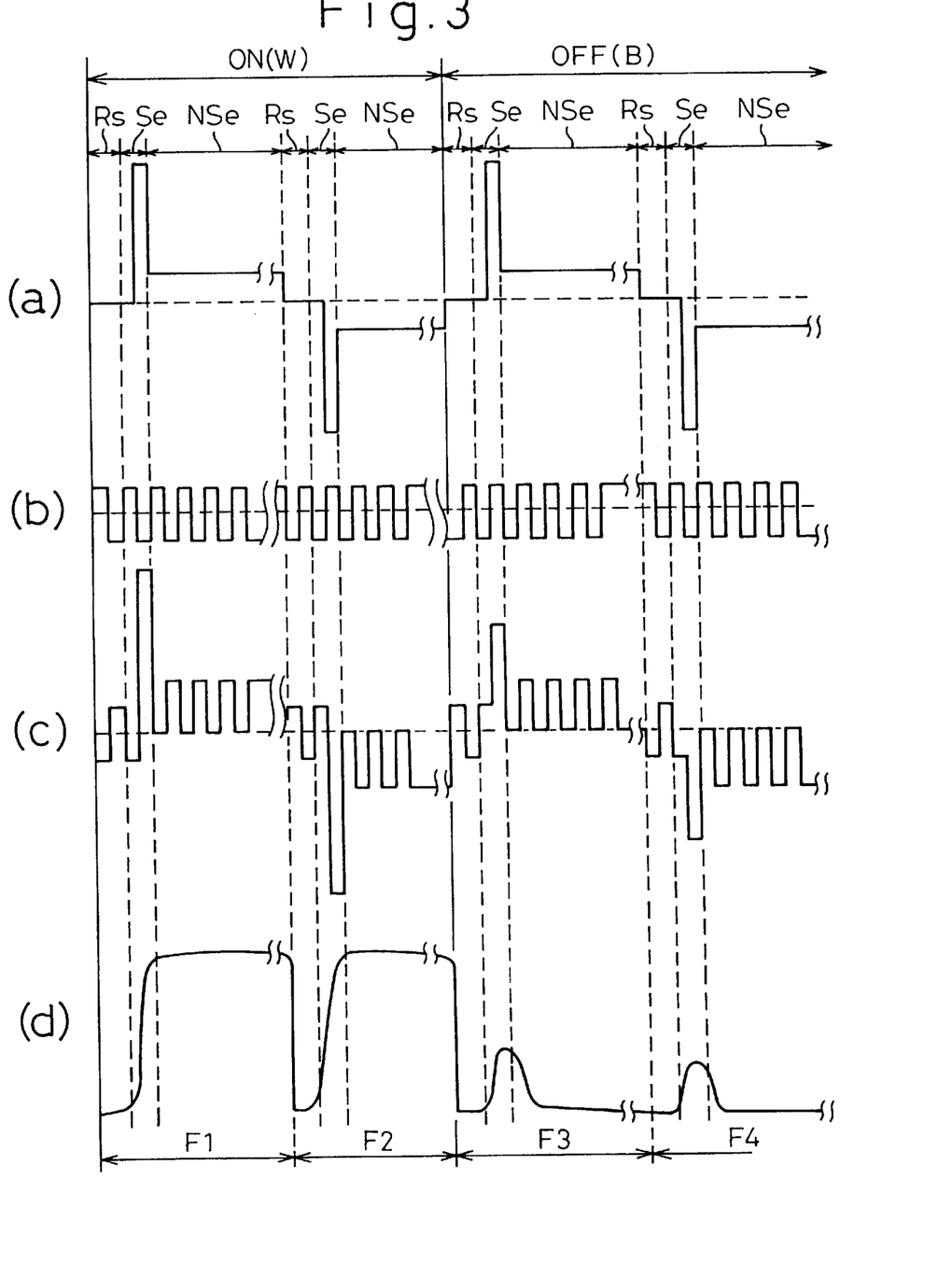
FIG. 3 is a diagram showing driving voltage waveforms for antiferroelectric liquid crystal according to the conventional art, and their corresponding light transmittance.

FIG. 3 is a diagram showing display driving voltage waveforms for an antiferroelectric liquid crystal according to the conventional art. As shown in FIG. 3, writing to a pixel is accomplished by applying a scanning voltage (a) to a scanning electrode and a signal voltage (b) to a signal electrode and thereby applying the resulting composite voltage (c) to the pixel which is formed from a liquid crystal element. According to the conventional art, when driving an antiferroelectric liquid crystal display, the first or second ferroelectric state or the antiferroelectric state is selected in a selection period (Se), and the selected state is held throughout the following non-selection period (NSe), as shown in FIG. 3. That is, a selection pulse is applied in the selection period (Se), and the light transmittance (d) obtained as the result of the selection is maintained throughout the following non-selection period (NSe) to produce the display.

In an antiferroelectric liquid crystal display device, it is generally practiced to reset the antiferroelectric liquid crystal to the first or second ferroelectric state or the antiferroelectric state immediately before writing to the pixel. For example, in FIG. 3, each selection period (Se) is immediately preceded by a reset period (Rs). During this reset period, a voltage lower than the threshold voltage is applied to the pixel to reset the antiferroelectric liquid crystal to the antiferroelectric state. By resetting the state of each pixel in this way immediately before writing necessary information to the pixel, a good display can be produced with each pixel being unaffected by its previously written state.

In FIG. 3, F1, F2, F3, and F4 denote the first, second, third, and fourth frames, respectively. In this waveform diagram, a white display is produced in the first and second frames, and a black display is produced in the third and fourth frames. The voltage polarity is usually reversed from one frame to the next, as shown in the figure.

Antiferroelectric liquid crystal used in an antiferroelectric liquid crystal display forms a layer structure with layers called smectic layers within a liquid crystal panel. The geometry of this layer structure changes according to the applied voltage waveform, as shown in FIG. 4.

Figure 4:
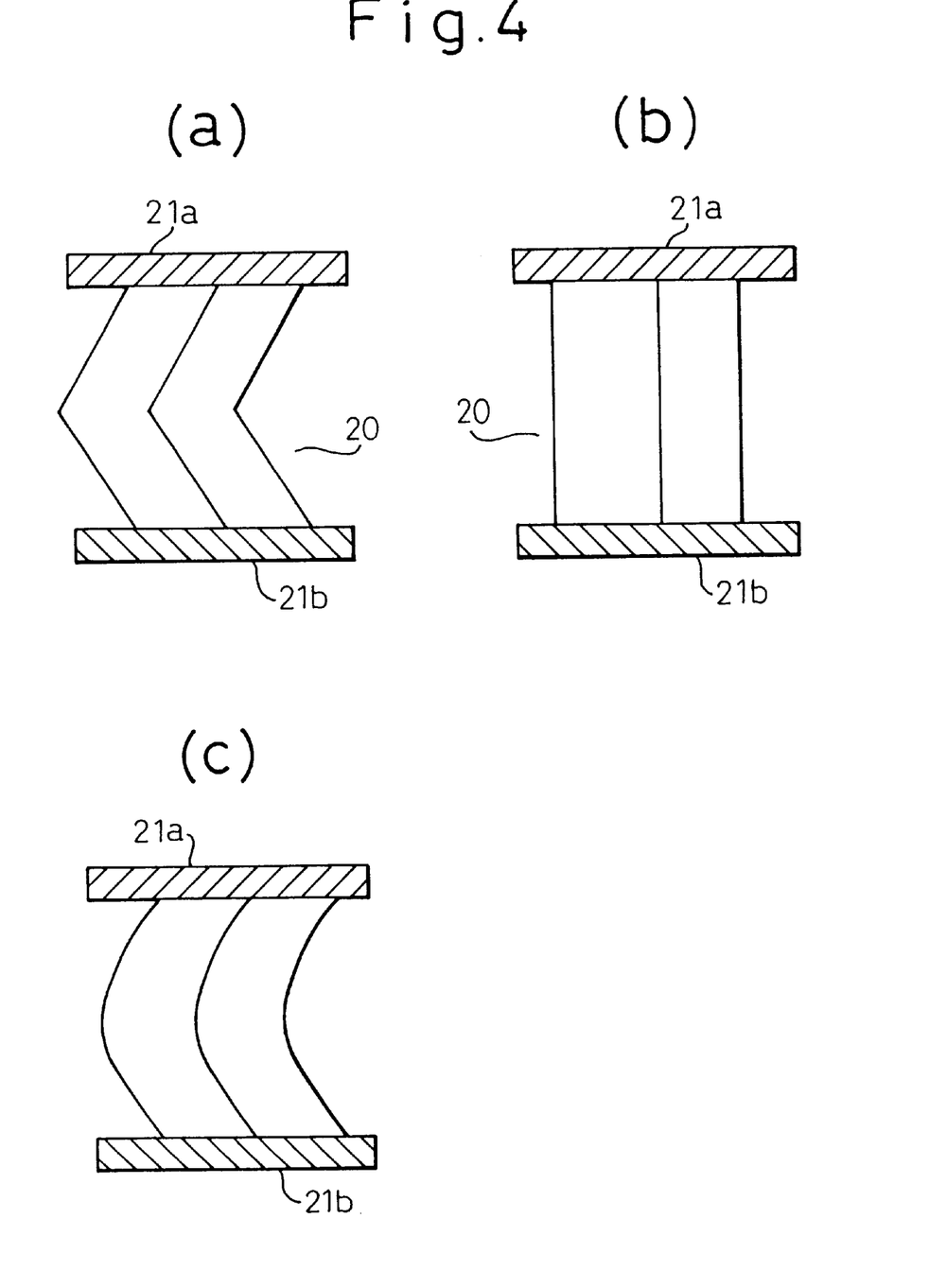
FIG. 4 is a diagram showing the smectic layer structure within an antiferroelectric liquid crystal cell.

FIG. 4 is a diagram showing the smectic layer structure formed within the antiferroelectric liquid crystal cell; as shown, a liquid crystal layer 20 is sandwiched between a pair of glass substrates 21a and 21b. Immediately after the liquid crystal is injected into the liquid crystal panel, the layer structure is the chevron structure with the layers bent in the middle between the top and bottom glass substrates, as shown part (a) of the figure. When the layer structure controlling voltage waveform is applied, the layer structure changes to the bookshelf structure with the layers lying perpendicular to the top and bottom substrates, as shown in part (b) of the figure. If the temperature changes thereafter, causing a change in the smectic layer spacing, the layer structure changes to a structure similar to the initial chevron structure, as shown in part (c) of the figure. Thereafter, when the display voltage waveform is applied to the liquid crystal cell, the layer structure changes to a quasi-bookshelf structure in the case of a white display, while in the case of a black display, the layer structure remains substantially unchanged and the layer structure shown in part (c) is retained.

The earlier described "image sticking phenomenon" is believed to be caused by the smectic layer structure differing in a manner dependent on the temperature change and display state.

Next, a description will be given of the relationships of the layer spacing and light transmittance relative to the temperature of the liquid crystal layer.

Figure 5:
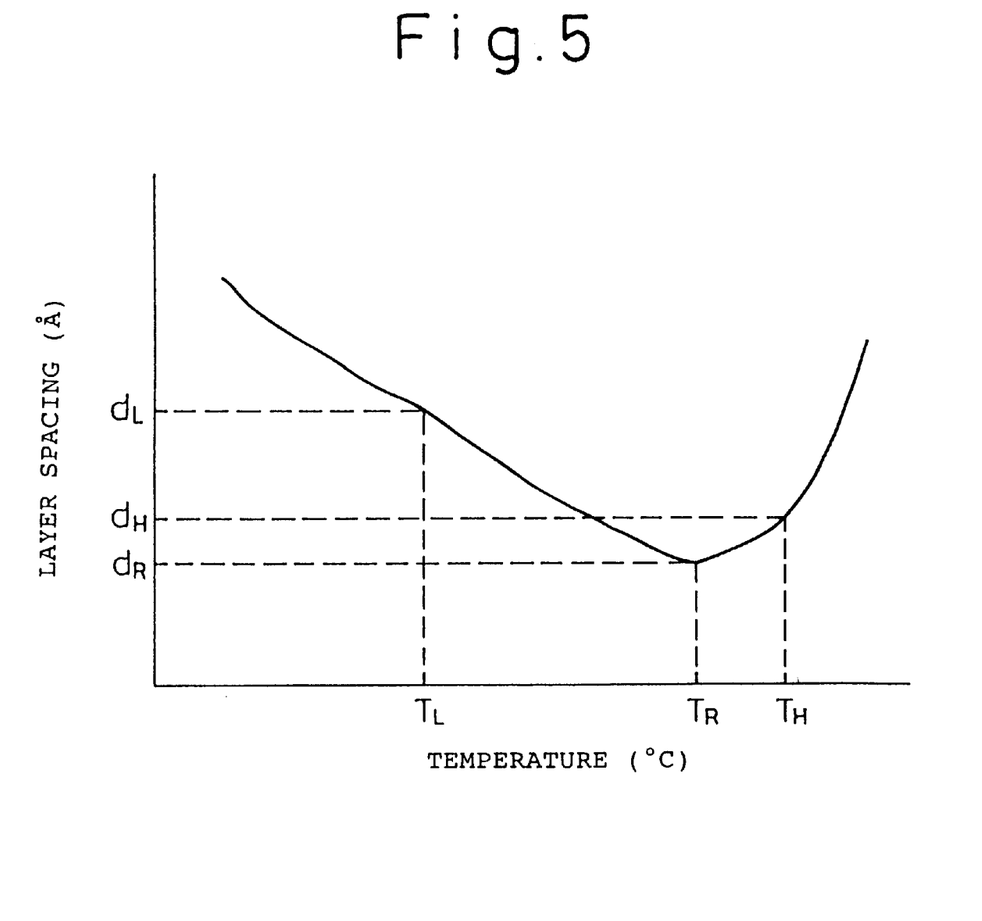
FIG. 5 is a graph showing an example of the relationship between the layer spacing and the temperature of the antiferroelectric liquid crystal.

FIG. 5 shows an example of the relationship between the layer spacing and the temperature of antiferroelectric liquid crystal. In the case of the liquid crystal shown in the figure, the layer spacing dR is the smallest at room temperature TR, the layer spacing increasing as the temperature drops below TR, as shown, for example, by dL versus TL and, as the temperature rises above TR, as shown, for example, by dH versus TH.

Figure 6:
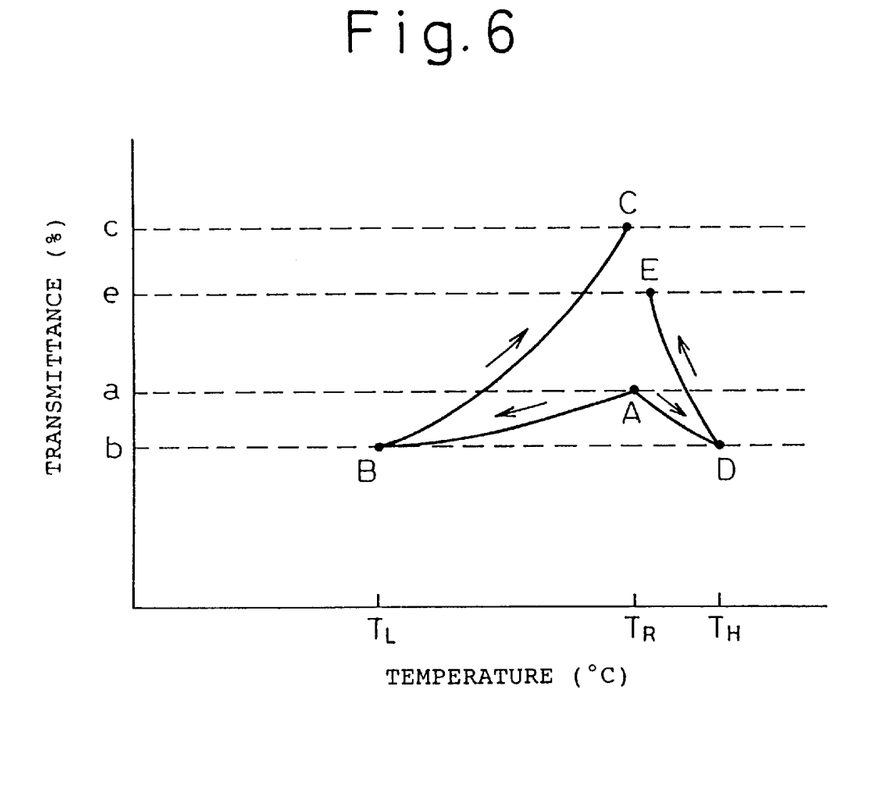
FIG. 6 is a diagram showing an example of the variation of light transmittance with temperature history of the antiferroelectric liquid crystal when no voltage is applied.

FIG. 6 shows an example of the variation of light transmittance with temperature history when no voltage is applied. In the liquid crystal panel comprising a liquid crystal device having the property that the layer spacing dR is the smallest at room temperature TR, the temperature of the liquid crystal panel was lowered from TR to TL, then raised back to TR. FIG. 6 shows the relationship between the light transmittance and the temperature during the process of this temperature history; as shown, the light transmittance changed from point A to point B, then to point C. That is, in this example, when the temperature was lowered from TR to TL, the light transmittance decreased from a % to b %, but when the temperature was raised from TL to TR, the light transmittance increased and reached c % at point C. On the other hand, when the temperature of the liquid crystal panel was raised from TR to TH and then lowered back to TR, the light transmittance changed from point A to point D, then to point E. That is, in this example, when the temperature was raised from TR to TH, the light transmittance decreased from a % to b %, but when the temperature was lowered from TH to TR, the light transmittance increased and reached e % at point E.

From the above results, it can be seen that the light transmittance increases with decreasing layer spacing and decreases with increasing layer spacing.

In the conventional art, to prevent the "image sticking phenomenon", a layer structure controlling voltage waveform circuit was provided separately from the display driving circuit so as to apply a layer structure controlling voltage waveform to the liquid crystal panel. The layer structure controlling voltage waveform is applied to the liquid crystal in order to cause the smectic layer structure of the antiferroelectric liquid crystal to change from the chevron structure, for example, shown in FIG. 4(a) or 4(c), to the bookshelf structure shown in FIG. 4(b). A rectangular wave is suitable for use as the layer structure controlling voltage waveform. It has also been found that a frequency within the range of 1 Hz to 100 Hz and a voltage value within the range of ±10 V to ±50 V, where dielectric breakdown does not occur between the top and bottom glass substrates of the liquid crystal panel, are suitable.

Figure 7:
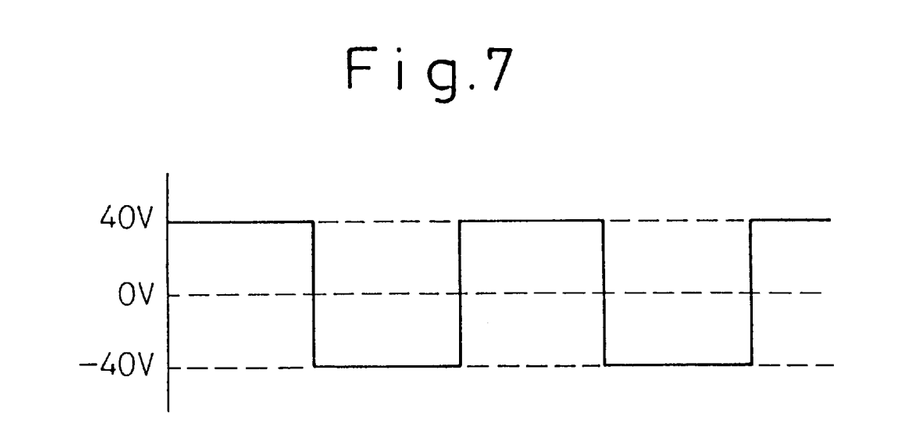
FIG. 7 is a diagram showing an example of a layer structure controlling voltage waveform.

FIG. 7 shows an example of the layer structure controlling voltage waveform. In the case of the waveform shown, the frequency is 20 Hz and the voltage value is ±40 V.

On the other hand, the frequency of the display driving voltage waveform for an antiferroelectric liquid crystal, such as shown in FIG. 3, is 30 Hz to 70 Hz, though it depends on the display panel used. The voltage applied during the selection period (Se) is, for example, ±30 V, and the holding voltage applied during the non-selection period (NSe) is usually around ±10 V.

After studying the above two kinds of voltage waveforms, the inventor has discovered that if the display driving voltage waveform for antiferroelectric liquid crystal is set so that the peak value of the scanning voltage applied during the non-selection period (NSe) becomes equal to the peak value of the voltage applied during the selection period (Se), a voltage waveform close to the optimum layer structure controlling voltage waveform can be obtained.

Figure 8:
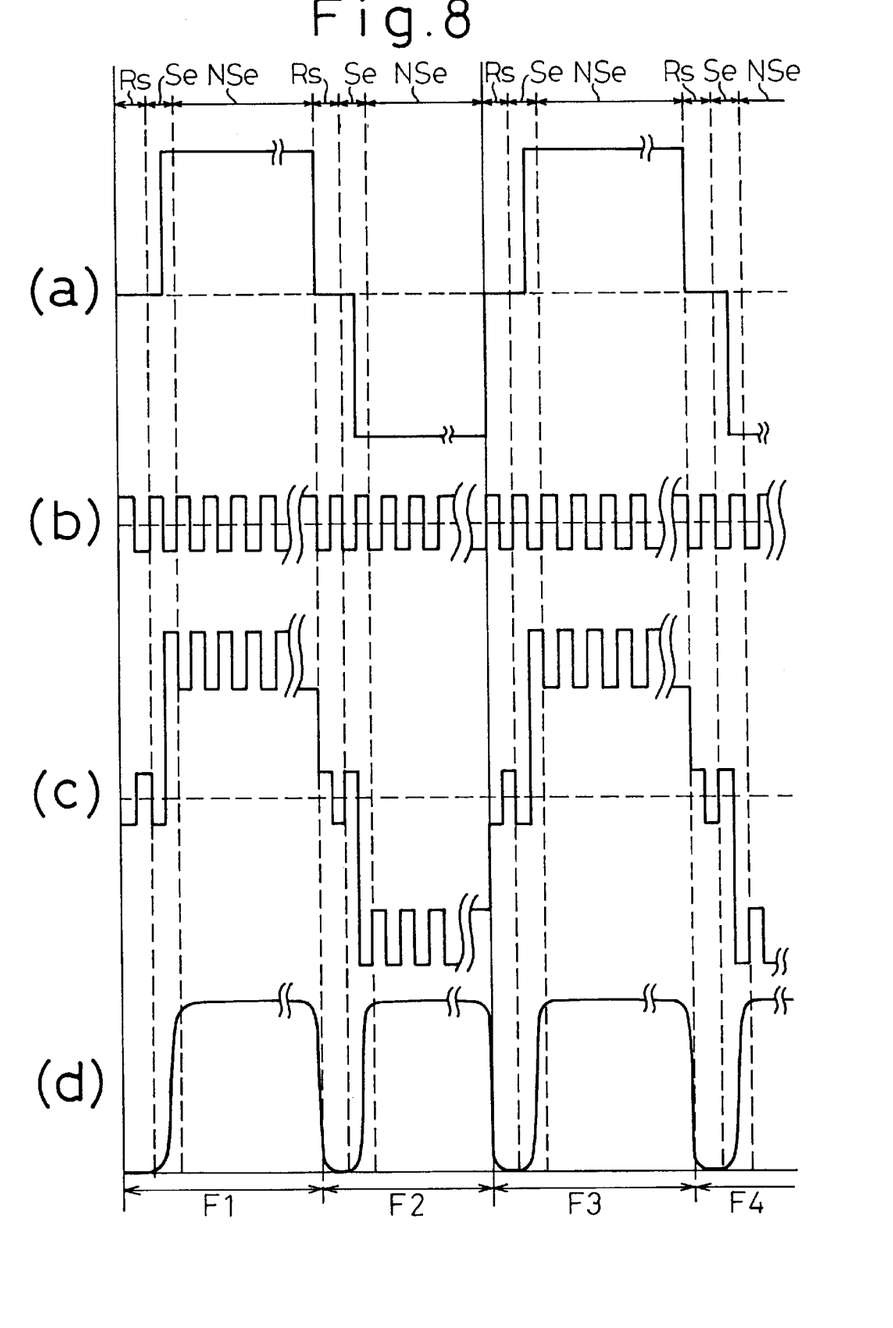
FIG. 8 is a diagram showing a waveform when the display driving voltage waveform for antiferroelectric liquid crystal shown in FIG. 3 is set so that the peak value of the scanning voltage applied during the non-selection period becomes equal to the peak value of the voltage applied during the selection period.

FIG. 8 shows waveforms when the display driving voltage waveform for antiferroelectric liquid crystal shown in FIG. 3 is set so that the peak value of the scanning voltage applied during the non-selection period (NSe) becomes equal to the peak value of the voltage applied during the selection period (Se). In FIG. 8, (a) is the scanning voltage waveform, (b) is the signal voltage waveform, (c) is the composite voltage waveform, and (d) is the light transmittance. The waveform (a) shown in FIG. 8 provides a voltage waveform close to the layer structure controlling voltage waveform.

Figure 9:
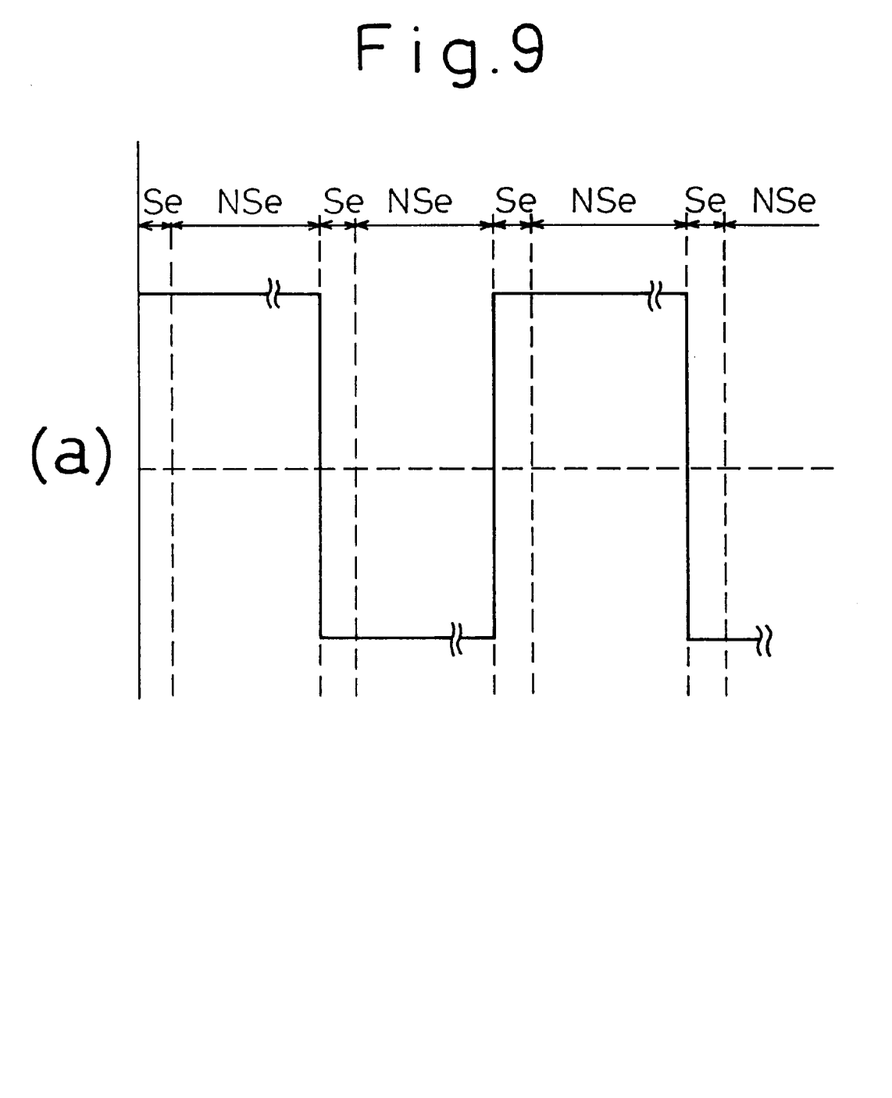
FIG. 9 is a diagram showing a waveform when the reset period is set to 0 in the waveform shown in FIG. 8.

The waveform shown in FIG. 8 has a reset period (Rs). However, if the peak value of the scanning voltage waveform is made the same for all periods (selection period, non-selection period, and reset period) within one frame, a more effective layer structure controlling voltage waveform can be produced. In view of this, the length of the reset period is made adjustable in the voltage waveform shown in FIG. 8. FIG. 9 shows the waveform when the reset period (Rs) is set to 0. The driving voltage waveform control circuit 11 shown in FIG. 10 controls the scanning voltage waveform generating circuit 13 to control the reset period.

Figure 10:
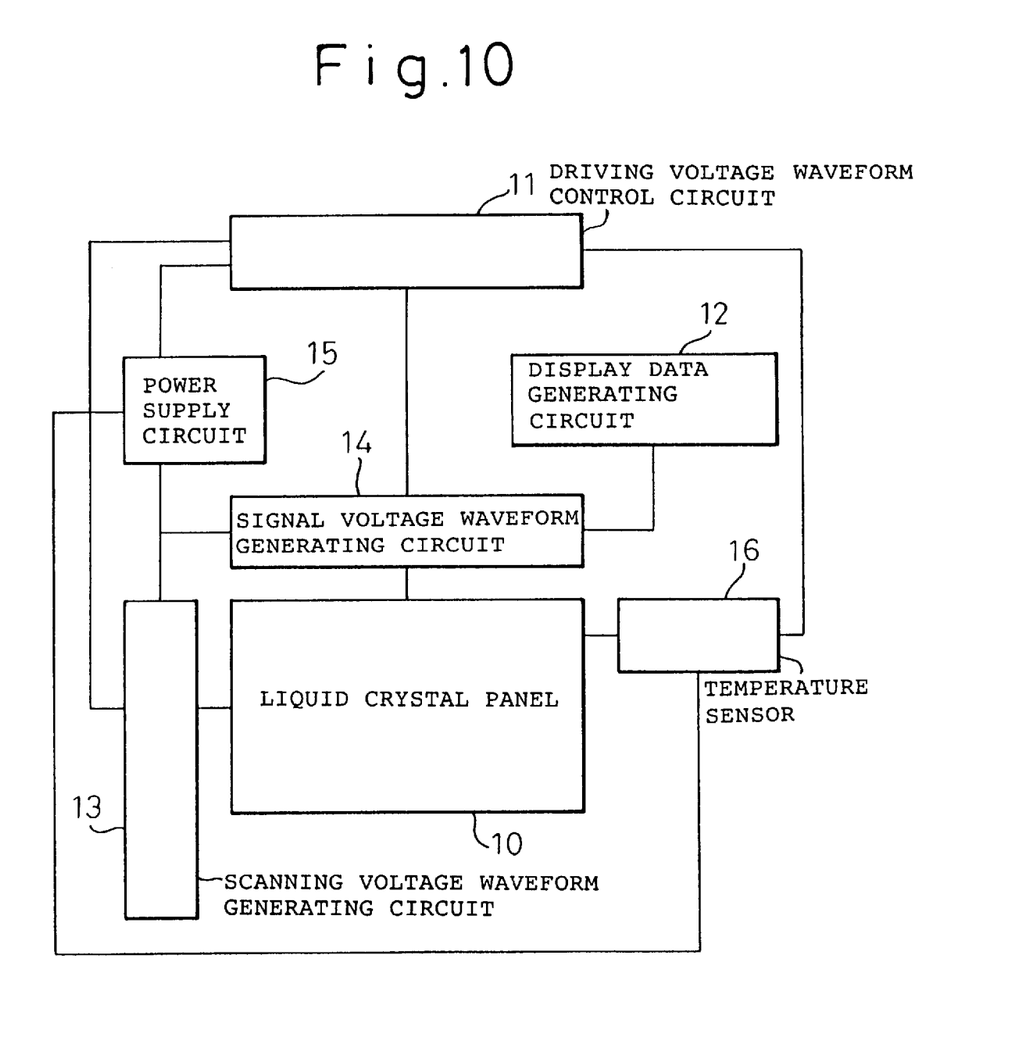
FIG. 10 is a block diagram of the antiferroelectric liquid crystal display according to the present invention.

FIG. 10 shows a block diagram of the antiferroelectric liquid crystal display of the present invention having a configuration capable of outputting the layer structure controlling voltage waveform without the need to provide a separate layer structure controlling voltage waveform circuit.

The antiferroelectric liquid crystal display of the present invention comprises, as shown in FIG. 10, a liquid crystal panel 10, driving voltage waveform control circuit 11 for controlling the driving voltage waveform, display data generating circuit 12, scanning voltage waveform generating circuit 13, signal voltage waveform generating circuit 14, power supply circuit 15, and temperature sensor 16. The power supply circuit 15 creates a DC voltage necessary for the generation of the scanning voltage waveform and signal voltage waveform, and voltages at necessary levels are output at appropriate timing from the scanning voltage waveform generating circuit 13 and signal voltage waveform generating circuit 14 for application to the liquid crystal panel. These circuits constitute the display driving circuit.

The DC voltage created by the power supply circuit 15 has seven levels, that is, ±VS, ±VO, and 0 that the scanning voltage waveform generating circuit outputs during the selection period, non-selection period, and reset period, respectively, and ±VC that the signal voltage waveform generating circuit outputs.

Figure 11:
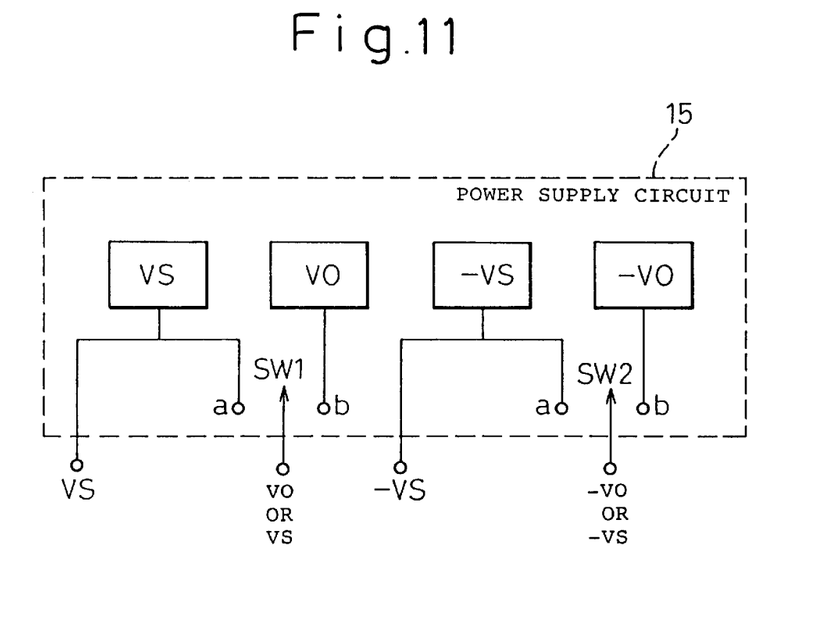
FIG. 11 is a diagram showing an example of the configuration of a power supply circuit in FIG. 10.

FIG. 11 is a diagram showing the configuration of the power supply circuit 15, illustrating an example of the configuration for switching, in accordance with the present invention, the voltage level between ±VS, which is output from the scanning voltage waveform generating circuit during the selection period, and ±VO, which is output in the non-selection period.

When outputting the scanning voltage waveform shown in FIG. 3(a) for normal liquid crystal driving, selector switches SW1 and SW2 in the power supply circuit 15 shown in FIG. 11 are both connected to contacts b. As a result, ±VS is output during the selection period and ±VO during the non-selection period.

On the other hand, when applying the layer structure controlling voltage waveform, the selector switches SW1 and SW2 in the power supply circuit 15 shown in FIG. 11 are both thrown to contacts a. Then, ±VS is output during the non-selection period as well as the selection period, thus outputting the scanning voltage waveform shown in FIG. 8(a).

In the power supply circuit 15, an AC-DC conversion circuit converts an ordinary AC voltage to a prescribed DC voltage (for example, 5 V). The AC-DC converted voltage is further converted by a DC voltage conversion circuit to create, for example, a DC voltage of about ±30 V as the selection voltage (VS), a DC voltage of about ±7 V as the non-selection voltage (VO), and a DC voltage of about ±6 V as the signal voltage (VC).

As shown in FIG. 10, the temperature sensor 16 for measuring the surface temperature of the liquid crystal panel 10 is attached to the surface of the liquid crystal panel 10. Information from this temperature sensor 16 is input to the power supply circuit 15, and the contacts a or b of the switches SW1 and SW2 are selected depending on the temperature change detected.

In the present invention, normally the driving waveform shown in FIG. 3 is applied to the liquid crystal to produce the display. On the other hand, when, for example, the temperature of the liquid crystal panel 10 drops from room temperature to a temperature lower than 10° C. and then rises above 10° C., the smectic layer structure changes and the "image sticking phenomenon" occurs. In such a case, the layer structure controlling voltage waveform shown in FIG. 8 is applied to the liquid crystal panel to alleviate the "image sticking phenomenon".

Figure 12:
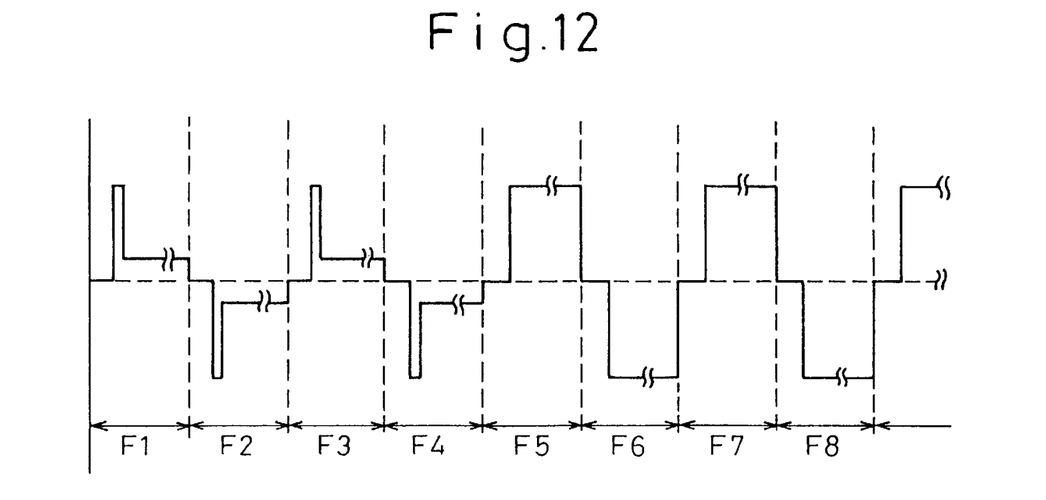
FIG. 12 is a diagram showing the voltage waveform applied to the liquid crystal in the antiferroelectric liquid crystal display of the present invention.

FIG. 12 shows the scanning voltage waveform for the case when a temperature change occurs during application of the normal driving waveform and the contacts of the switches SW1 and SW2 of FIG. 11 are switched from b to a to alleviate the "image sticking phenomenon" occurring due to the temperature change. As shown, the normal driving voltage waveform (in frames F1 to F4) is followed by the scanning voltage waveform (from frame F5 onward) of FIG. 8(a) which is applied as the layer structure controlling voltage waveform to the liquid crystal. Using a scanning voltage waveform whose one frame period (the sum of the reset period, selection period, and non-selection period) is about 17 ms, a layer structure controlling voltage waveform, in which the peak value of the scanning voltage waveform applied during the selection period and the peak value of the scanning voltage waveform applied during the non-selection period were both set to ±30 V, was applied to the liquid crystal for about one second. As a result, the change in the geometry of the smectic layer structure due to the temperature change was corrected, and the "image sticking phenomenon" did not occur. Further, the application of the layer structure controlling voltage waveform had little effect on the display quality, since the application time was very short. The length of time over which the layer structure controlling voltage waveform is applied is determined by issuing an instruction from the driving voltage waveform control circuit 11 to the power supply circuit 15 in FIG. 11.

Next, a voltage waveform, similar to the one shown in FIG. 9, in which the peak value of the scanning voltage waveform applied during the selection period and the peak value of the scanning voltage waveform applied during the non-selection period were both set to ±30 V and the reset period was set to 0, was applied as the layer structure controlling voltage waveform. In this case also, the "image sticking phenomenon" could likewise be reduced.

In the above description, the layer structure controlling voltage waveform is output based on the information from the temperature sensor 16, but the layer structure controlling voltage waveform may be output at predetermined intervals of time. In the latter case, the temperature sensor shown in FIG. 10 is not needed. Instead, a timer is provided in the power supply circuit 15 so that the layer structure controlling voltage waveform can be output at predetermined intervals of time.

Figure 13:
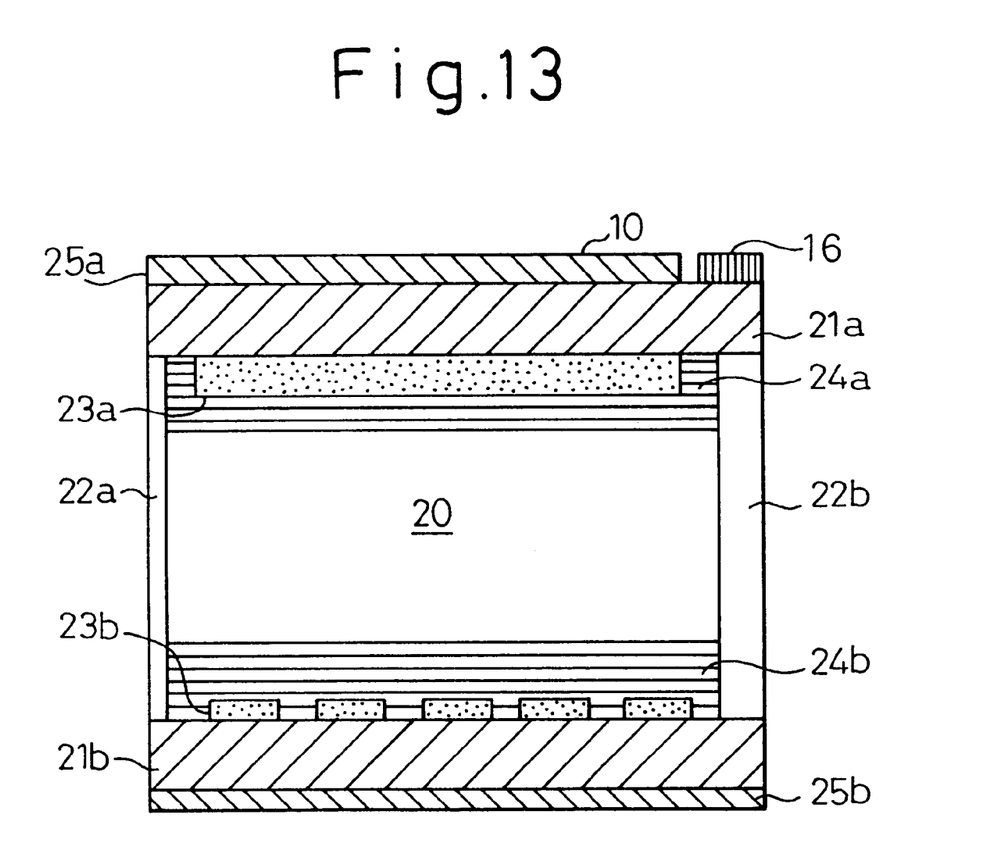
FIG. 13 is a diagram showing an example of the structure of the antiferroelectric liquid crystal panel used in the present invention.

FIG. 13 is a diagram showing an example of the structure of the liquid crystal panel 10 constituting the antiferroelectric liquid crystal display used in the present invention. The liquid crystal panel 10 comprises: a pair of glass substrates 21a and 21b between which an antiferroelectric liquid crystal layer 20 with a thickness of about 2 μm is sandwiched; and sealing members 22a and 22b for bonding the two glass substrates together. On the opposing surfaces of the glass substrates are formed electrodes 23a and 23b, which are coated with polymeric alignment films 24a and 24b, respectively, and are treated by rubbing. On the outside surface of one glass substrate is disposed a first polarizer 25a with its polarization axis oriented parallel to the rubbing axis, while on the outside surface of the other glass substrate, a second polarizer 25b is arranged with its polarization axis oriented at 90° to the polarization axis of the first polarizer 25a. The temperature sensor 16 is mounted on the surface of the liquid crystal panel 10.

What is claimed is:

1. An antiferroelectric liquid crystal display comprising a liquid crystal panel with an antiferroelectric liquid crystal sandwiched between a pair of substrates having scanning electrodes and signal electrodes, said liquid crystal display including a display driving circuit adapted to output a layer structure controlling voltage waveform for an optional length of time, said layer structure controlling voltage waveform being created by setting a display driving voltage waveform so that the peak value of a scanning voltage waveform applied during a selection period becomes equal to the peak value of a scanning voltage waveform applied during a non-selection period.

2. An antiferroelectric liquid crystal display as claimed in claim 1, wherein said liquid crystal panel includes a temperature sensor, and in accordance with information output from said temperature sensor, said display driving voltage waveform in which the peak value of said scanning voltage waveform applied during said selection period is set equal to the peak value of said scanning voltage waveform applied during said non-selection period is output as said layer structure controlling voltage waveform from said display driving circuit for said optional length of time.

3. An antiferroelectric liquid crystal display as claimed in claim 2, wherein when the information output from said temperature sensor indicates a temperature change that reduces layer spacing in said antiferroelectric liquid crystal, said display driving voltage waveform in which the peak value of said scanning voltage waveform applied during said selection period is set equal to the peak value of said scanning voltage waveform applied during said non-selection period is output as said layer structure controlling voltage waveform from said display driving circuit for said optional length of time.

4. An antiferroelectric liquid crystal display as claimed in claim 1, wherein said display driving voltage waveform in which the peak value of said scanning voltage waveform applied during said selection period is set equal to the peak value of said scanning voltage waveform applied during said non-selection period is output as said layer structure controlling voltage waveform from said display driving circuit for optional length of time at optional intervals of time.

5. An antiferroelectric liquid crystal display as claimed in claim 1, wherein said display driving voltage waveform has an adjustable reset period preceding said selection period.

6. A method of driving an antiferroelectric liquid crystal display comprising a liquid crystal panel with an antiferroelectric liquid crystal sandwiched between a pair of substrates having scanning electrodes and signal electrodes, wherein a layer structure controlling voltage waveform is output for a optional length of time, said layer structure controlling voltage waveform being created by setting a display driving voltage waveform so that the peak value of a scanning voltage waveform applied during a selection period becomes equal to the peak value of a scanning voltage waveform applied during a non-selection period.

7. A method of driving an antiferroelectric liquid crystal display, as claimed in claim 6, wherein said liquid crystal panel includes a temperature sensor, and in accordance with information output from said temperature sensor, said display driving voltage waveform in which the peak value of said scanning voltage waveform applied during said selection period is set equal to the peak value of said scanning voltage waveform applied during said non-selection period is output as said layer structure controlling voltage waveform for said optional length of time.

8. A method of driving an antiferroelectric liquid crystal display, as claimed in claim 7, wherein when the information output from said temperature sensor indicates a temperature change that reduces layer spacing in said antiferroelectric liquid crystal, said display driving voltage waveform in which the peak value of said scanning voltage waveform applied during said selection period is set equal to the peak value of said scanning voltage waveform applied during said non-selection period is output as said layer structure controlling voltage waveform for said optional length of time.

9. A method of driving an antiferroelectric liquid crystal display, as claimed in claim 6, wherein said display driving voltage waveform in which the peak value of said scanning voltage waveform applied during said selection period is set equal to the peak value of said scanning voltage waveform applied during said non-selection period is output as said layer structure controlling voltage waveform for optional length of time at optional intervals of time.

10. A method of driving an antiferroelectric liquid crystal display, as claimed in claim 6, wherein said display driving voltage waveform has an adjustable reset period preceding said selection period.

* * * * *

UNITED STATES PATENT AND TRADEMARK OFFICE
CERTIFICATE OF CORRECTION

PATENT NO.    : 6,339,416 B1
DATED         : January 15, 2002
INVENTOR(S)   : Shinya Kondoh It is certified that error appears in the above-identified patent and that said Letters Patent is hereby corrected as shown below:

<u>Column 9,</u>
Line 2, "optional intervals" should read -- predetermined intervals --.

<u>Column 10,</u>
Line 19, "optional intervals" should read -- predetermined intervals --.

Signed and Sealed this

Thirtieth Day of December, 2003

JAMES E. ROGAN
*Director of the United States Patent and Trademark Office*